United States Patent [19]

Inoue et al.

[11] 4,038,477
[45] July 26, 1977

[54] PROCESS FOR THE PRODUCTION OF POLYOLEFIN POWDER

[75] Inventors: Hiroshi Inoue, Ohi; Makoto Yoda, Kawagoe; Shozo Wada, Zushi, all of Japan

[73] Assignee: Toa Nenryo Kogyo Kabushiki Kaisha, Tokyo, Japan

[21] Appl. No.: 633,597

[22] Filed: Nov. 19, 1975

[30] Foreign Application Priority Data

Nov. 29, 1974 Japan .................................. 49-136151

[51] Int. Cl.$^2$ ............................ C08F 6/12; C08C 2/06
[52] U.S. Cl. ..................................... 528/487; 528/488; 528/489; 528/491; 528/493; 528/495; 528/496; 528/497; 528/498; 528/499
[58] Field of Search ............... 528/487, 499, 489, 488, 528/491, 493, 495, 496, 497, 498

[56] References Cited

U.S. PATENT DOCUMENTS

| | | | |
|---|---|---|---|
| 2,484,614 | 10/1949 | D'Ianni | 528/487 |
| 3,269,997 | 8/1966 | Lyons et al. | 528/487 |
| 3,554,994 | 1/1971 | Maloney et al. | 528/499 |
| 3,746,681 | 7/1973 | McClain | 528/499 |

*Primary Examiner*—William F. Hamrock
*Attorney, Agent, or Firm*—William T. Clark; Ben C. Cadenhead

[57] ABSTRACT

Spherical polyolefin (or modified polyolefin) powders having high bulk density, narrow particle size distribution and good powder flowability are prepared by cooling a polyolefin solution comprising a solvent and nonsolvent for the polyolefin and containing a small amount of an inorganic compound and, if desired, water. The polyolefin powders are suitable for powder coating. Suitable solvents are hydrocarbons, such as hexane, heptane, etc., and a mixture of hydrocarbon and nonsolvent for polyolefin such as methyl alcohol, ethyl alcohol, isopropyl alcohol, etc. The ratio of a hydrocarbon/nonsolvent is 95/5 – 30/70, preferably 90/10 – 50/50. Suitable inorganic compounds are phosphoric acid, sulfuric acid, sulfurous acid, hydrochloric acid, sodium hydroxide, potassium hydroxide, ammonium hydroxide, inorganic salts thereof, etc. and the most preferable inorganic compound is phosphoric acid.

10 Claims, No Drawings

PROCESS FOR THE PRODUCTION OF POLYOLEFIN POWDER

FIELD OF THE INVENTION

This invention relates to a process for the production of fine powders of polyolefins such as polyethylene, polypropylene, polybutene-1 and ethylene-propylene copolymers or modified polyolefins and more particularly to a process for the production of fine polyolefin powders suitable for powder coating, which have a narrow particle size distribution, globular form, high bulk density and good powder flowability.

DESCRIPTION OF THE PRIOR ART

Polyolefin powders have been used for powder coating by the fluid immersion method or electrostatic powder coating method, which can be prepared by the mechanical method wherein the polyolefin pellets are mechanically ground at normal temperature or low temperature or by the chemical method wherein a polyolefin is dissolved in a suitable solvent at a high temperature and then cooled or mixed with a non-solvent such as alcohols in a large amount to form a fine precipitate, followed by separating and drying. In the mechanical method, however, it is very difficult to obtain fine powders of polypropylene, polybutene-1, ethylenepropylene copolymers, etc., and, in particular, it is necessary to grind at a very low temperature with a large amount of coolant such as liquid nitrogen in order to obtain a powder with a fineness suitable for electrostatic powder coating. Therefore, this method is lacking in practicability from an economic point of view.

On the other hand, in accordance with the chemical method, a fine powder having a relatively narrow particle size distribution can be obtained in a solvent, but, when this fine powder is separated from the solvent and dried, aggregation of the particles takes place, so it is difficult to obtain economically a fine powder having a desired particle size even by the use of a secondary mechanical grinding. In the chemical method, therefore, it has been proposed (1) to use a spray drier in the drying step so as to prevent the aggregation of fine particles or (2) to grow the precipitated particles under stationary state so as to control the primary particle size of the formed precipitate and to prevent aggregation of the particles. In accordance with proposal (1), the use of a spray drier necessitates an expensive and large apparatus, which is undesirable from an economical point of view. It is difficult, however, to obtain a powder having a high bulk density as well as excellent powder flowability with a desired particle size even by the use of a spray drier. In proposal (2), on the other hand, the cooling and crystallization under stationary state is not practical on a commerical scale. Furthermore, these proposals have a disadvantage that the fine powder having a desired particle size obtained by a secondary mechanical grinding and sieving shows a low bulk density and poor powder flowability, and, therefore, transporting, storage and handling of the powder is not easy.

SUMMARY OF THE INVENTION

The present invention provides a process for the production of a fine polyolefin powder, which comprises precipitating the polyolefin from a solution of the polyolefin in a mixture of a solvent and non-solvent (a) in the presence of an inorganic compound capable of forming an ion or ion pair in the non-solvent in water, or (b) in the presence of the inorganic compound and water and then drying the separated polyolefin.

DESCRIPTION OF THE PREFERRED EMBODIMENTS

In a preferred embodiment of the present invention, a polyolefin is dissolved at a high temperature in a mixed uniform system of a solvent and non-solvent for the polyolefin, the solution is cooled (a) in the presence of a small amount of an ion-forming inorganic compound dissolved therein or (b) in the presence of small amounts of water and the ion-forming inorganic compound dissolved therein and the thus deposited polyolefin slurry is separated from the uniform mixture of solvent and non-solvent by filtration or centrifugal separation and then dried. The resulting powder is subjected, if necessary, to a secondary mechanical grinding to obtain a fine powder with the desired particle size.

The important feature of the invention consists in the presence of (i) a small amount of an ion-forming inorganic compound or (ii) water and the ion-forming inorganic compound dissolved in the system when polyolefin particles are deposited from a solution of the polyolefin in a solvent and non-solvent by cooling, thereby obtaining globular particles having a narrower particle size distribution and much larger particle size as precipitated primary particles than those of the prior art. In the method of the prior art, for example, wherein a polyolefin is dissolved in a solvent or a mixed system of a solvent-non-solvent and cooled to deposit particles, the deposited primary particles having a relatively small particle size of several microns or less tend to become aggregated during the subsequent separation from the solvent or drying step to thus form secondary particles having an irregular shape and very wide particle size distribution. The resulting secondary particles each consisting of a number of fine primary particles have a low bulk density and inferior powder flowability, and cannot be returned to primary particles even by further mechanical grinding. Accordingly, the bulk density and powder flowability cannot be improved and sieving is necessary for obtaining a desired particle size range.

In accordance with the process of the present invention, on the contrary, polyolefin primary particles are formed or deposited, for example, by cooling a solution system having a very narrow particle size distribution and globular form and the particle size can be controlled within a range of 10 to 100 microns by suitably choosing the conditions. When the formed globular particles are separated from the solvent by filtration or centrifugal separation, the separation can be completed readily because the particle size of primary particles is large, i.e., 10 to 100 microns. The polyolefin particles separated from the solvent are not aggregated in any substantial amount when dried to remove the residual solvent by means of an ordinary hot air drier or rotary drier and, even if aggregated to some extent, the aggregated particles can readily and completely be reconverted to primary particles by a simple secondary mechanical grinding after the drying due to their small aggregation force. The polyolefin particles obtained by the process of the present invention have a particle size of 10 to 100 microns, which distribution is so narrow that sieving is not necessary at the time of using. The particle give a high bulk density as well as very excellent powder flowability since they are substantially primary particles each of which is globular. In particular, the olefin particles of the invention can exhibit a very excellent working property in a powder coating which needs a particle size of 20 to 100 microns as that of primary particle.

In the present invention, moreover, it is not necessary to use an expensive spray drier, nor to hold a stationary state when the particles are deposited from a solution. Therefore, the present invention is very superior also in economy for the purpose of industrailization thereof.

Formation of globular primary particles having a large particle size by the addition of a small amount of an ion-forming inorganic compound or water and the ion-forming inorganic compound according to the feature of the present invention cannot be anticipated from the knowledge of the prior art. Furthermore, it is surprisingly found by observation using a polarizing microscope that each of the globular particles of the invention is a spherulite. These facts cannot be elucidated theoretically at present.

The present invention will now be illustrated in greater detail. The process of the invention is applicable to polyethylene, polypropylene, polybutene-1, ethylenepropylene random copolymer, ethylene-propylene block copolymer, ethylene-$\alpha$-olefin copolymer, ethylene-vinyl acetate copolymer, ethylene-acrylic acid copolymer, homopolymers and copolymers of ethylene and $\alpha$-olefins, and chemically modified products of such polyolefins, for example, carboxylated polyolefins obtained by the addition reaction or graft reaction of alicyclic carboxylic acids having cis-type double bonds in the ring or anhydrides thereof, and $\alpha,\beta$-unsaturated carboxylic acids or anhydrides thereof. Furthermore, the present invention can of course be adapted to the blends of these polymers or copolymers. In the powder application or powder coating of a polyolefin powder such as polypropylene powder to a metal or glass, in general, an excellent coating characteristic of the polyolefin can be obtained, but the adhesiveness of the coating to the metal or glass is insufficient. Therefore, the process of the invention is most useful in the case of improving the adhesiveness by copolymerization of an olefin with a polar monomer, addition or graft copolymerization of a polar monomer or blending of these modified polymers.

In the process of the invention, a uniform solution consisting of a polyolefin - solvent - non-solvent is used. Where such a uniform solution is discharged as product or by-product from a certain process, it can of course be used as it is, but such a uniform solution is ordinarily prepared by dissolving a polyolefin in a mixture of a solvent and non-solvent. The solvent used herein is an organic solvent capable of dissolving polyolefins by itself at normal termperature or high temperarutres, for example, aliphatic or aromatic hydrocarbons or halogenated hydrocarbons. Useful examples of the organic solvent are pentane, hexane, heptane, octane, decane, benzene, toluene, xylene, ethylbenzene, chloroform, trichloroethylene, chlorobenzene and mixtures thereof. The non-solvent used herein means an organic solvent not capable of dissolving polyolefins by itself. Useful examples of the organic solvent suitable as non-solvent in the practice of the invention are acetone, methyl alcohol, ethyl alcohol, isopropyl alcohol and n-butyl alcohol. Preferred combinations of the solvent and non-solvent are aliphatic hydrocarbons such as hexane, heptane and octane and alcohols such as methyl alcohol, ethyl alcohol and isopropyl alcohol. The proportion of the solvent and non-solvent used depends upon the varieties of the solvent and non-solvent, variety of the polyolefin and particle size of the polyolefin particles, but, in general, it is 95:5 to 30:70 by weight, preferably 90:10 to 50:50. If the proportion of the solvent and non-solvent exceeds 95:5, the formed primary particles have a small particle size and tend to become aggregated and if less than 30:70, no uniform phase is obtained and there occurs separation into two phases with unfavorable results.

The quantity of the polyolefin dissolved in the mixture of a solvent and non-solvent is not particularly limited, but, in general, it is 5 to 50 parts by weight of the polyolefin per 100 parts by weight of the mixed solvent, since if less than 5 parts by weight, the productivity is lowered, while if more than 50 parts by weight, the viscosity of the solution is too high. The temperature at which the polyolefin is dissolved depends upon the varieties of solvent and non-solvent used, the proportion thereof and variety of polyolefin used, but may be chosen so as to dissolve the polyolefin in a practical period of time. The temperature is ordinarily 60° to 300° C.

Deposition of the polyolefin from a solution of the polyolefin in a mixed solvent in the present invention can be carried out by evaporating and removing the mixed solvent, but the most desirable method consists in cooling the mixed solvent solution to deposit the polyolefin.

The important feature of the invention is that, when polyolefin particles are deposited from a solution of the polyolefin in the mixture of solvent and non-solvent, for example, by cooling the same, a small amount of an ion-forming inorganic compound or water and the ion-forming inorganic compound are present dissolved in the system, whereby globular particles having a particle size of 10 to 100 microns can be formed even by cooling with agitation. When there is no ion-forming inorganic compound in the system, very fine primary particles having a size of several microns or less are formed which tend to become aggregated again during the subsequent drying step; accordingly, excellent polyolefin particles such as produced in the present invention cannot be obtained unless deposition of the particles is carried out under extremely limited conditions, for example. by gradual cooling while maintaining the solution in a quiet state.

The ion-forming inorganic compound used herein is an inorganic compound capable of forming an ion or ion pair in water or a non-solvent for a polyolefin, for example, inorganic acids, inorganic bases and salts thereof which are substantially soluble in water. Useful examples of the ion-forming inorganic compound are phosphoric acid, sulfuric acid, sulfurous acid, hydrochloric acid, sodium hydroxide, potassium hydroxide, ammonium hydroxide and salts thereof. Phosphoric acid, sulfuric acid, sulfurous acid, phosphates, sulfates and sulfites are preferably used and, in particular, phosphoric acid is most preferable.

In addition to the presence of the above described inorganic compounds, a small amount of water is preferably dissolved in the system. In this case, spherical primary particles having a particle size of 10 to 100 microns can readily be formed even by cooling rapidly with vigorous agitation. The effect brought by the presence of such an inorganic compound and water is an unknown and surprising phenomenon that cannot be expected from the knowledge of the prior art.

The quantities of the above described inorganic compound and water to be added, depending upon the variety and proportion of solvent and non-solvent, the variety and concentration of the polyolefin and the particle size of polyolefin particles desired, are generally 5 to 500 ppm by weight of the inorganic compound and 0 to 2.0% by weight of water based on the mixed solvent. If the quantity of the inorganic compound is less than 5 ppm, it is substantially ineffective, while if more than 500 ppm, few globular particles having a particle size of 10 to 100 microns are formed while a majority of the particles formed are fine particles of several microns or less. If water is added in a quantity of more than 2.0% by weight, phase separation of the solvent and non-solvent takes place often and, consequently, primary particles with a particle size of 10 microns or more cannot be obtained. The inorganic compound and water can be added to the system before or after dissolving the polyolefin in the system. The cooling condition for forming polyolefin particles in the system is not particularly limited as far as there is the above described inorganic compound or water and the inorganic compound in the system and a gradual cooling or rapid cooling can be adopted with our without agitation.

The so-obtained polyolefin slurry containing globular particles having a particle size of 10 to 100 microns is subjected to filtration or centrifugal separation to separate the particles from the mixed system of the solvent and non-solvent at normal temperature or at or below a temperature at which the polyolefin is dissolved. Thereafter, the system is dried to remove the residual solvent and nonsolvent by means of a stationary or rotary hot air drier, stationary or rotary vacuum drier or fluidized drying aapparatus. The feature of the invention is that during the drying step, there are scarcely formed coarse particles due to aggregation of the primary particles. Even when some aggregation of the primary particles takes place according to the variety of polyolefin, the primary particles have a relatively large particle size, that is, of 10 to 100 microns and a spherical shape, so the aggregated particles can be ground and reconverted to primary particles in very easy manner using a simple grinding machine.

The polyolefin powder obtained by the process of the invention consists substantially of primary particles which are not aggregrated, each of which has a completely globular shape and which particle size distribution is thus very narrow and therefore shows a high bulk density, very excellent powder flowability and superior working property in the intended use, for example, powder coating.

The following examples are to illustrate the invention in greater detail:

EXAMPLE 1

1 kg of each of crystalline polypropylene (Melt Flow Rate = 15,) ethylene-propylene block copolymer containing 7% by weight of ethylene (Melt Flow Rate = 12), low density polyethylene (Density = 0.924, Melt Index = 20) and high density polyethylene (Density = 0.960, Melt Index = 15) pellets and 10 kg of each of mixed solvents of n-heptane and ethyl alcohol in a proportion of 70:30 by weight were charged individually into autoclaves, to each of which 50 ppm of phosphoric acid and 1.0% by weight of water were added based on each mixed solvent, and each mixture was then heated at 150° C. for 20 minutes with agitation to dissolve each polyolefin completely. After stopping the heating, each solution was cooled by passing cooling water through the jacket while stirring and, when the temperature of each system was 50° C., the stirring was stopped. Each of the above-described polyolefin powders was recovered from the resulting slurry by centrifugal separation and dried at 120° C. for 5 hours by means of a rotary type hot air drier. Each dried powder was then subjected to secondary grinding at 3500 rpm for 2 minutes using a Henshel mixer to obtain a fine powder of each polyolefin having a high bulk density, superior powder flowability and narrow particle size distribution.

TABLE I

| Run No. | Polyolefin | Mean Particle Size[1] Of Primary Particles ($\mu$) | Shape | Particles after Drying and Secondary Grinding ||||||
|---|---|---|---|---|---|---|---|---|---|
| | | | | Bulk Density[2] | Powder Flowability | Particle Size Distribution[3] ||||
| | | | | | | <10$\mu$ | 10–40$\mu$ | 40–70$\mu$ | 70–100$\mu$ | >100$\mu$ |
| 1 | Polypropylene | 40 | Globular Particles | 0.36 | Very Good | 2 | 38 | 58 | 2 | 0 |
| 2 | Ethylene-Propylene Block Copolymer | 15 | Fine Particles Aggregate and Globular Particles | 0.28 | Good | 20 | 31 | 29 | 20 | 0 |
| 3 | High Density Polyethylene | 5 | Globular Particles and Aggregate Thereof | 0.42 | Good | 35 | 28 | 23 | 14 | 0 |
| 4 | Low Density Polyethylene | 5 | " | 0.46 | Good | 28 | 33 | 25 | 14 | 0 |

Notes:
[1]Slurry was observed by an optical microscope.
[2]Calculated by measurement of a volume of constant weight.
[3]Measured by a particle size meter of light-permeable type using ethyl alcohol as a medium.

EXAMPLE 2

The procedure of Example 1 was repeated using a modified polypropylene (Melt Flow Rate = 30) obtained by chemically adding 0.3% by weight of maleic anhydride to crystalline polypropylene and a modified polypropylene (Melt Flow Rate =50) obtained by grafting 4.0% by weight of acrylic acid to crystalline polypropylene respectively instead of the polyolefins of Example 1, thus obtaining fine powders of the modified polypropylene each having a high bulk density, superior powder flowability and narrow particle size distribution as shown in Table II.

TABLE II

| Run No. | Polyolefin | Mean Particle Size Of Primary Particles[1] (μ) | Shape | Bulk Density[2] | Powder Flowability | Particles after Drying and Secondary Grinding Partical Size Distribution[3] | | | | |
|---|---|---|---|---|---|---|---|---|---|---|
| | | | | | | <10μ | 10–40μ | 40–70μ | 70–100μ | >100μ |
| 5 | Maleic Anhydride-Modified Polypropylene | 40 | Globular Particles | 0.34 | Very Good | 1 | 39 | 58 | 2 | 0 |
| 6 | Acrylic Acid-Modified Polypropylene | 35 | " | 0.36 | " | 5 | 40 | 53 | 2 | 0 |

Notes:
[1]Slurry was observed by an optical microscope.
[2]Calculated by measurement of a volume of constant weight.
[3]Measured by a particle size meter of light-permeable type using ethyl alcohol as a medium.

EXAMPLE 3

The procedure of Example 1 was repeated except using a modified polypropylene (Melt Flow Rate =18) obtained by chemically adding 0.15% by weight of endobicyclo[2,2,1]-5-heptene-2,3-dicarboxylic anhydride to crystalline polypropylene and varying the quantities of phosphoric acid and water to obtain a modified fine polypropylene powder having the properties as shown in Table III.

As evident from Table III, in the system (Run Nos. 9 and 10) of adding a suitable amount of phosphoric acid, primary particle having a large particle size are formed and, consequently, a powder obtained after drying and grinding shows a high bulk density, superior powder flowability and very narrow particle size distribution. In particular, in the system of adding suitable amounts of phosphoric acid and water (Run No. 10), a more excellent powder is obtained. In the system containing no phosphoric acid (Run Nos. 7 and 8) or containing an excess amount of phosphoric acid or water (Run Nos. 11 and 13), on the other hand, primary particles having a small particle size are formed and so strongly aggregated during centrifugal separation and drying that a powder having a low bulk density, inferior powder flowability and wide particle size distribution is only obtained even by a secondary grinding.

EXAMPLE 4

400 g of modified polypropylene pellets (Melt Flow Rate =40) obtained by adding chemically 0.30% by weight of endobicyclo[2,2,1]-5-heptene-2,3-dicarboxylic anhydride to crystalline polypropylene and 600 g of crystalline polypropylene pellets (Melt Flow Rate =9) were charged in an autoclave with 10 kg of a mixed solvent of n-heptane and ethyl alcohol or isopropyl alcohol in a predetermined proportion, to which phosphoric acid and water were added in a proportion of 40 ppm and 1.0% by weight, respectively, based on the mixed solvent, and the mixture was heated at 150° C. for 30 minutes with agitation to dissolve completely. The subsequent procedure was carried out in an analogous manner to Example 1 to obtain a powder of modified polypropylene-crystalline polypropylene having the properties shown in Table IV.

It is apparent from Table IV that in a solvent-non-solvent mixed system of n-heptane-ethyl alcohol or isopropyl alcohol, a relatively good powder can be obtained even with a n-heptane to alcohol rate of 90/10, but the best result can be obtained within a range of 80/20 to 60/40. When this ratio is 50/50, the particle size of primary particles becomes fine again and a good powder cannot be obtained.

TABLE III

| Run No. | Amount of Phosphoric Acid[1] (ppm) | Amount of Water[2] % | Mean Particle Size of Primary Particles[3] (μ) | Shape | Bulk Density[4] | Powder Flowability | Particles After Drying and Secondary Grinding Particle Size Distribution[5] | | | | |
|---|---|---|---|---|---|---|---|---|---|---|---|
| | | | | | | | <10μ | 10–40μ | 40–70μ | 70–100μ | >100μ |
| 7 | 0 | 0 | 2 or less | Fine Particles Aggregate | 0.18 | Not Good | 13 | 21 | 23 | 26 | 17 |
| 8 | 0 | 1.0 | 2 or less | " | " | " | 11 | 20 | 19 | 28 | 22 |
| 9 | 40 | 0 | 15 | Fine Particles Aggregate and Globular Particles | 0.32 | Good | 15 | 48 | 37 | 0 | 0 |
| 10 | 40 | 1.0 | 40 | Globular Particles Only | 0.38 | Very Good | 1 | 59 | 40 | 0 | 0 |
| 11 | 40 | 2.5 | 2 or less | Fine Particles Aggregate | 0.19 | Not Good | 16 | 18 | 21 | 29 | 26 |
| 12 | 100 | 1.0 | 5 | " | 0.24 | Somewhat Fairly Good | 21 | 21 | 28 | 20 | 0 |
| 13 | 1000 | 1.0 | 2 or less | " | 0.19 | Not Good | 15 | 18 | 18 | 21 | 28 |

Notes:
[1]Based on n-Heptane-Ethyl Alcohol Mixed Solvent.
[2]Based on n-Heptane-Ethyl Alcohol Mixed Solvent.
[3]Slurry was observed by an optical microscope.
[4]Calculated by measurement of a volume of constant weight.
[5]Measured by a particle size meter of light-permeable type using ethyl alcohol as a medium.

TABLE IV

| Run No. | Composition of Mixed Solvent System | (% by weight) | Mean Particle Size of Primary Particles (μ) | Particles After Drying and Secondary Grinding Shape | Bulk Density | Powder Flowability |
|---|---|---|---|---|---|---|
| 14 | n-Heptane | 100 | 5 | Fine Particles Aggregate | 0.25 | Not Good |
| 15 | n-Heptane / Ethyl Alcohol | 90 / 10 | 10 | Globular Particles and Fine Particles Aggregate | 0.32 | Good |
| 16 | n-Heptane / Ethyl Alcohol | 80 / 20 | 40 | Globular Particles | 0.36 | Very Good |
| 17 | n-Heptane / Ethyl Alcohol | 70 / 30 | 35 | " | 0.36 | " |
| 18 | n-Heptane / Ethyl Alcohol | 60 / 40 | 40 | " | 0.34 | " |
| 19 | n-Heptane / Ethyl Alcohol | 50 / 50 | 20 | " | 0.25 | Not Good |
| 20 | n-Heptane / Isopropyl Alcohol | 90 / 10 | 20 | " | 0.30 | Good |
| 21 | n-Heptane / Isopropyl Alcohol | 80 / 20 | 40 | " | 0.36 | Very Good |
| 22 | n-Heptane / Isopropyl Alcohol | 70 / 30 | 35 | " | 0.36 | " |
| 23 | n-Heptane / Isopropyl Alcohol | 60 / 40 | 20 | " | 0.30 | Good |
| 24 | n-Heptane / Isopropyl Alcohol | 50 / 50 | 7 | Fine Particles Aggregate and Globular Particles | 0.23 | Not Good |

EXAMPLE 5

1 kg of modified polypropylene pellets (Melt Flow Rate = 40) obtained by chemically adding 0.15% by weight of endobicyclo[2,2,1]-5-heptene-2,3-dicarboxylic anhydride to crystalline polypropylene and 10 kg of a mixed solvent of n-heptane (70% by weight) and isopropy alcohol (30% by weight) were charged in an autoclave, to which 1.0% by weight of water and a predetermined amount of a compound shown in Table V were added based on the mixed solvent, and the mixture was heated at 150°C. with agitation to dissolve completely. The subsequent procedure was carried out in an analogous manner to Example 1 to obtain a modified polypropylene powder having the properties shown in Table V.

As is evident from Table V, the organic acids such as acetic acid, monochloroacetic acid, trichloroacetic acid and formic acid are ineffective while inorganic compounds which are substantially soluble in water and capable of forming an ion in water are effective in the practice of the invention. Examples of such compounds are hydrochloric acid, phosphoric acid, sulfuric acid, sulfurous acid, potassium dihydrogen phosphate, ammonium monohydrogen phosphate, sodium hydrogen sulfate, potassium sulfate, sodium chloride and sodium hydroxide. Of these inorganic compounds, phosphoric acid is preferred.

TABLE V

| Run No. | Compound Added | Amount (ppm) | Particle Size of Primary Particles (μ) | Particles after Drying and Grinding Bulk Density | Powder Flowability |
|---|---|---|---|---|---|
| 25 | Formic Acid | 50 | 2 or less | 0.18 | Not Good |
| 26 | Formic Acid | 200 | " | 0.19 | " |
| 27 | Acetic Acid | 50 | " | 0.18 | " |
| 28 | Acetic Acid | 200 | " | " | " |
| 29 | Monochloroacetic Acid | 50 | " | 0.17 | " |
| 30 | Monochloroacetic Acid | 200 | " | 0.18 | " |
| 31 | Trichloroacetic Acid | 30 | " | " | " |
| 32 | Hydrochloric Acid | 15 | 8 | 0.26 | Good |
| 33 | Hydrochloric Acid | 45 | 12 | 0.28 | " |
| 34 | Sulfuric Acid | 10 | 10 | " | " |
| 35 | Sulfuric Acid | 80 | 15 | 0.30 | " |
| 36 | Sulfurous Acid | 20 | " | " | " |
| 37 | Sulfurous Acid | 40 | 25 | 0.35 | Very Good |
| 38 | Ammonium Monohydrogen Phosphate | 40 | 5 | 0.22 | Somewhat Good |
| 39 | Potassium Dihydrogen Phosphate | 30 | 15 | 0.31 | Good |
| 40 | Potassium Dihydrogen Phosphate | 40 | " | " | " |
| 41 | Potassium Dihydrogen Phosphate | 50 | 20 | 0.33 | Very Good |
| 42 | Phosphoric Acid | 20 | " | 0.34 | " |
| 43 | Phosphoric Acid | 40 | 40 | 0.36 | " |
| 44 | Phosphoric Acid | 50 | 30 | " | " |
| 45 | Sodium Hydrogen Sulfate | 50 | 15 | 0.30 | Good |
| 46 | Potassium Sulfate | 50 | " | 0.32 | " |
| 47 | Sodium Chloride | 50 | 5 | 0.23 | Somewhat Good |
| 48 | Sodium Hydroxide | 50 | " | 0.22 | " |

What is claimed is:

1. A process for the production of a fine polyolefin powder which comprises precipitating the polyolefin from a solution of the said polyolefin in a mixture of a solvent and non-solvent therefor, said mixture having a ratio of solvent to non-solvent in the range of about 95:5 to about 30:70 parts by weight, in the presence of about 5 to about 500 ppm by weight, of an inorganic compound capable of forming an ion or ion pair in water or the non-solvent and then drying the precipitated polyolefin powder.

2. THe process of claim 1 wherein water is also present in an amount of up to about 2.0% by weight.

3. The process of claim 1 wherein the ratio of solvent to non-solvent is 90:10 to 50:50 parts by weight.

4. The process of claim 1 wherein the polyolefin is present in the amount of 5 to 50 parts by weight of polyolefin per 100 parts by weight of solvent.

5. A process for the production of a fine polyolefin powder which comprises dissolving the polyolefin in a mixture of a solvent with a non-solvent therefor, said mixture having a ratio of solvent to non-solvent in the range of about 95:5 to 30:70 parts by weight, precipitating the polyolefin from the mixture by cooling in the presence of about 5 to about 500 ppm by weight of an inorganic compound capable of producing an ion or ion pair in the non-solvent or in water, and then drying the precipitated polyolefin powder.

6. The process of claim 5 wherein water is also present in an amount of up to about 2.0% by weight.

7. The process of claim 6 wherein the solvent is selected from the group consisting of aliphatic hydrocarbons, aromatic hydrocarbons, and halogenated hydrocarbons.

8. The process of claim 7 wherein the non-solvent is selected from the group consisting of acetone methyl alcohol, ethyl alcohol, isopropyl alcohol and n-butyl alcohol.

9. The process of claim 6 wherein the polyolefin is dissolved at a temperature of 60° to 300° C.

10. The process of claim 6 wherein the inorganic compound is phosphoric acid.

* * * * *